United States Patent
Chartier et al.

(10) Patent No.: US 9,753,699 B2
(45) Date of Patent: Sep. 5, 2017

(54) LIVE BROWSER TOOLING IN AN INTEGRATED DEVELOPMENT ENVIRONMENT

(75) Inventors: Daniel P. Chartier, Seattle, WA (US); Joseph M. Davis, Issaquah, WA (US); Jorge E. Gabuardi Gonzalez, Seattle, WA (US); Vishal R. Joshi, Redmond, WA (US); Michael J. Harder, Bellevue, WA (US); Michael Bach, Seattle, WA (US); Anh Thi-Phuong Phan, Renton, WA (US); Reshmi Mangalore, Redmond, WA (US); Jon E. Jung, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 526 days.

(21) Appl. No.: 13/161,529

(22) Filed: Jun. 16, 2011

(65) Prior Publication Data

US 2012/0324422 A1    Dec. 20, 2012

(51) Int. Cl.
*G06F 9/44* (2006.01)
*G06F 17/30* (2006.01)
*G06F 9/455* (2006.01)

(52) U.S. Cl.
CPC ............ *G06F 8/33* (2013.01); *G06F 8/75* (2013.01); *G06F 8/34* (2013.01); *G06F 8/355* (2013.01);
(Continued)

(58) Field of Classification Search
CPC ............ G06F 8/34; G06F 8/33; G06F 8/355
See application file for complete search history.

(56) References Cited

U.S. PATENT DOCUMENTS

| 5,740,430 A | 4/1998 | Rosenberg et al. |
| 5,740,444 A | 4/1998 | Frid-Nielsen |

(Continued)

FOREIGN PATENT DOCUMENTS

| CN | 101645009 A | 2/2010 |
| CN | 102270116 A | 12/2011 |

OTHER PUBLICATIONS

Lie et al/, Cascading Styple Sheets Designing for the Web, Third Edition, published 2005, pp. 1-5.*

(Continued)

*Primary Examiner* — Tuan Q. Dam
*Assistant Examiner* — Zheng Wei

(57) ABSTRACT

A selection in a browser can be mapped back to a corresponding location range in one or more source files that generated the selection. A selection in a source file can be mapped to the corresponding location range in the browser's DOM. The selection in the browser can be mapped to a location range in a block list generated from the DOM. The location range in the DOM's block list can be mapped to a corresponding location range in a block list generated from the fetched file received from a web server. The location range in the fetched file's block list can be mapped to a particular location in the particular source file responsible for generating the selection in the browser. The selection in the browser and the source file can be displayed concurrently, the source file scrolled to the location range corresponding to the selection in the browser.

20 Claims, 8 Drawing Sheets

(52) U.S. Cl.
CPC ...... *G06F 9/45529* (2013.01); *G06F 17/3089* (2013.01)

(56) References Cited

U.S. PATENT DOCUMENTS

| | | | |
|---|---|---|---|
| 5,774,670 A | 6/1998 | Montulli | |
| 5,964,836 A | 10/1999 | Rowe et al. | |
| 6,023,764 A | 2/2000 | Curtis | |
| 6,038,573 A | 3/2000 | Parks | |
| 6,083,276 A | 7/2000 | Davidson et al. | |
| 6,092,100 A | 7/2000 | Berstis et al. | |
| 6,175,832 B1 | 1/2001 | Luzzi et al. | |
| 6,178,433 B1 | 1/2001 | Nakamura et al. | |
| 6,182,097 B1 | 1/2001 | Hansen et al. | |
| 6,205,432 B1 | 3/2001 | Gabbard et al. | |
| 6,247,020 B1* | 6/2001 | Minard | |
| 6,317,885 B1 | 11/2001 | Fries | |
| 6,330,572 B1 | 12/2001 | Sitka | |
| 6,393,569 B1 | 5/2002 | Orenshteyn | |
| 6,502,239 B2* | 12/2002 | Zgarba et al. | 717/168 |
| 6,609,246 B1 | 8/2003 | Guhr et al. | |
| 6,990,653 B1 | 1/2006 | Burd et al. | |
| 7,143,115 B2 | 11/2006 | Jones et al. | |
| 7,155,478 B2 | 12/2006 | Ims et al. | |
| 7,191,405 B1* | 3/2007 | Jaramillo | 715/763 |
| 7,194,682 B2* | 3/2007 | Warrington | G06F 17/3089 707/E17.116 |
| 7,246,134 B1 | 7/2007 | Kitain et al. | |
| 7,316,003 B1* | 1/2008 | Dulepet et al. | 717/111 |
| 7,325,191 B2 | 1/2008 | Goddard et al. | |
| 7,395,312 B2 | 7/2008 | Kothari et al. | |
| 7,440,967 B2 | 10/2008 | Chidlovskii | |
| 7,480,897 B2* | 1/2009 | Reinhardt | G06F 17/30908 707/999.201 |
| 7,503,035 B2 | 3/2009 | Zeidman | |
| 7,516,445 B2* | 4/2009 | Maennel et al. | 717/125 |
| 7,543,268 B2 | 6/2009 | Cherdron et al. | |
| 7,661,064 B2 | 2/2010 | Cicerone | |
| 7,689,564 B2 | 3/2010 | Deen et al. | |
| 7,694,282 B2 | 4/2010 | Arkhipov et al. | |
| 7,779,161 B2* | 8/2010 | Buchs et al. | 709/246 |
| 7,861,213 B2 | 12/2010 | Wang | |
| 7,890,919 B1* | 2/2011 | Williams | 717/100 |
| 7,941,755 B2* | 5/2011 | Siegrist | G06F 9/45512 715/708 |
| 8,032,597 B2 | 10/2011 | Khoo | |
| 8,281,284 B2* | 10/2012 | Na | 717/110 |
| 8,356,277 B1* | 1/2013 | Bank | G06F 9/45529 717/111 |
| 8,434,014 B1* | 4/2013 | Jaramillo | 715/763 |
| 8,499,237 B2* | 7/2013 | Buchs et al. | 715/255 |
| 8,713,520 B2* | 4/2014 | Bank | G06F 8/38 715/234 |
| 8,719,451 B1* | 5/2014 | Colton | G06F 17/3089 709/248 |
| 8,762,556 B2* | 6/2014 | Priyadarshan | G06F 17/2247 709/219 |
| 8,843,892 B2* | 9/2014 | Hamlin | G06F 8/73 717/120 |
| 2002/0023112 A1* | 2/2002 | Avital | 707/513 |
| 2002/0026461 A1 | 2/2002 | Kutay et al. | |
| 2002/0073236 A1 | 6/2002 | Helgeson et al. | |
| 2002/0170048 A1* | 11/2002 | Zgarba et al. | 717/168 |
| 2004/0003119 A1 | 1/2004 | Munir et al. | |
| 2004/0034846 A1 | 2/2004 | Ortal et al. | |
| 2004/0254942 A1* | 12/2004 | Error | G06F 17/3089 |
| 2005/0114381 A1 | 5/2005 | Borthakur et al. | |
| 2005/0198565 A1 | 9/2005 | McChrystal | |
| 2006/0039348 A1 | 2/2006 | Racz et al. | |
| 2006/0080639 A1 | 4/2006 | Bustelo et al. | |
| 2006/0206865 A1* | 9/2006 | Reinhardt | G06F 17/30908 717/108 |
| 2007/0006155 A1* | 1/2007 | Maennel et al. | 717/124 |
| 2007/0011713 A1 | 1/2007 | Abramson et al. | |
| 2008/0033897 A1* | 2/2008 | Lloyd | G06F 8/34 706/19 |
| 2008/0033996 A1* | 2/2008 | Kesari | G06F 17/212 |
| 2008/0072136 A1* | 3/2008 | Lotenberg | 715/234 |
| 2008/0098349 A1* | 4/2008 | Lin | G06F 8/10 717/106 |
| 2008/0134142 A1 | 6/2008 | Nathan et al. | |
| 2008/0235660 A1 | 9/2008 | Chapman et al. | |
| 2008/0235671 A1* | 9/2008 | Kellogg et al. | 717/139 |
| 2008/0244509 A1* | 10/2008 | Buchs et al. | 717/106 |
| 2008/0270980 A1 | 10/2008 | Ahadian et al. | |
| 2008/0276183 A1* | 11/2008 | Siegrist | G06F 9/45512 715/748 |
| 2009/0019064 A1* | 1/2009 | Takafuji | G06F 17/30705 |
| 2009/0031228 A1* | 1/2009 | Buchs et al. | 715/764 |
| 2009/0094579 A1* | 4/2009 | Na | 717/110 |
| 2009/0100345 A1* | 4/2009 | Miller | G06F 11/3688 715/738 |
| 2009/0177959 A1 | 7/2009 | Chakrabarti et al. | |
| 2009/0178031 A1* | 7/2009 | Zhao | 717/143 |
| 2009/0204926 A1 | 8/2009 | Cochrane | |
| 2010/0042641 A1 | 2/2010 | Kamalakantha et al. | |
| 2010/0162096 A1* | 6/2010 | Morrill et al. | 715/234 |
| 2010/0192134 A1 | 7/2010 | Arkhipov et al. | |
| 2010/0251143 A1* | 9/2010 | Thomas | G06F 17/3089 715/760 |
| 2010/0293523 A1 | 11/2010 | Ahadian et al. | |
| 2011/0015917 A1 | 1/2011 | Wang et al. | |
| 2011/0023017 A1 | 1/2011 | Calvin | |
| 2012/0101929 A1* | 4/2012 | Howard | 705/35 |
| 2014/0006913 A1* | 1/2014 | Gopalakrishna | G06F 17/30896 715/200 |
| 2014/0026115 A1* | 1/2014 | Bank | G06F 8/38 717/113 |
| 2014/0096108 A1* | 4/2014 | Austin | 717/113 |

OTHER PUBLICATIONS

"Fetching an image and associated metadata with an AJAX request", Retrieved at <<http://stackoverflow.com/questions/939596/fetching-an-image-and-associated-metadata-with-an-ajax-request>>, Retrieved Date: Apr. 8, 2011, pp. 3.

Marte, et al., "OMS: Ontology Mapping Store", Retrieved at <<http://www.sti-innsbruck.at/fileadmin/documents/thesis/OMS-Ontology-Mapping-Store.pdf>>, Jan. 18, 2008, pp. 59.

Ashfield, et al., "System-independent file management and distribution services", Retrieved at <<http://ieeexplore.ieee.org/stamp/stamp.jsp?tp=&arnumber=5387567>>, IBM Systems Journal, vol. 28, No. 2, 1989, pp. 241-259.

Shannon, et al., "Deep Diffs: Visually Exploring the History of a Document", Retrieved at <<http://rossshannon.com/publications/softcopies/Shannon2010DeepDiffs.pdf>>, Proceedings of the International Conference on Advanced Visual Interfaces, AVI, May 26-28, 2010, pp. 4.

Ellis, et al., "Plagiarism Detection in Computer Code", Retrieved at <<http://www.rose-hulman.edu/class/csse/faculty-staff/csse-department/seniorTheses/Matt Ellis.pdf>>, Mar. 23, 2005, pp. 1-10.

Chevalier, et al., "Using Text Animated Transitions to Support Navigation in Document Histories", Retrieved at <<http://dmrussell.net/CHI2010/docs/p683.pdf>>, Conference on Human Factors in Computing Systems, Apr. 10-15, 2010, pp. 683-692.

"International Search Report", Mailed Date: Feb. 1, 2013, Application No. PCT/US2012/040956, filed date: Jun. 5, 2012, pp. 14.

Kerrigan, et al., "The Web Service Modeling Toolkit—An Integrated Development Environment for Semantic Web Services (System Description)", Proceedings of the 4th European conference on the Semantic Web: Research and Applications, 2007, pp. 10.

Wuyts, et al., "Unanticipated integration of development tools using the classification model", Computer Languages, Systems and Structures 30, 2004, pp. 15.

"Search Report Issued in European Patent Application No. 12800005.6", Mailed Date: Dec. 3, 2014, 9 Pages.

"First Office Action and Search Report Issued in Chinese Application No. 201280029384.9", Mailed Date: Sep. 1, 2015, 13 Pages.

(56) References Cited

OTHER PUBLICATIONS

"Office Action Issued in Japan Patent Application No. 2014-515870", Mailed Date: Nov. 13, 2015, 5 Pages.
"Second Office Action and Search Report Issued in Chinese Patent Application No. 201280029384.9", Mailed Date: Mar. 23, 2016, 17 Pages.
"Office Action Issued in European Patent Application No. 12801264.8", Mailed Date Aug. 1, 2016, 4 Pages.
"Supplementary Search Report Issued in European Patent Application No. 12801264.8", Mailed Date: Nov. 3, 2014, 7 Pages.
"Final Office Action Issued in U.S. Appl. No. 13/161,539", Mailed Date: May 23, 2014, 32 Pages.
"Final Office Action Issued in U.S. Appl. No. 13/161,539", Mailed Date: Apr. 29, 2013, 29 Pages.
"Non Final Office Action Issued in U.S. Appl. No. 13/161,539", Mailed Date: Jan. 30, 2014, 26 Pages.
"Non Final Office Action Issued in U.S. Appl. No. 13/161,539", Mailed Date: Oct. 15, 2012, 27 Pages.
"Non Final Office Action Issued in U.S. Appl. No. 13/161,539", Mailed Date: Apr. 5, 2016, 7 Pages.
"Notice of Allowance Issued in U.S. Appl. No. 13/161,539", Mailed Date: Aug. 9, 2016, 9 Pages.
"Notice of Allowance Issued in U.S. Appl. No. 13/161,539", Mailed Date: Feb. 2, 2016, 5 Pages.
"Notice of Allowance Issued in U.S. Appl. No. 13/161,539", Mailed Date: Sep. 15, 2015, 8 Pages.
"Advisory Action Issued in U.S. Appl. No. 13/161,559", Mailed Date: Jan. 8, 2014, 3 Pages.
"Final Office Action Issued in U.S. Appl. No. 13/161,559", Mailed Date: Oct. 30, 2013, 21 Pages.
"Final Office Action Issued in U.S. Appl. No. 13/161,559", Mailed Date: Apr. 23, 2015, 22 Pages.
"Final Office Action Issued in U.S. Appl. No. 13/161,559", Mailed Date: Aug. 20, 2015, 21 Pages.
"Non Final Office Action Issued in U.S. Appl. No. 13/161,559", Mailed Date Jun. 24, 2013, 20 Pages.
"Non Final Office Action Issued in U.S. Appl. No. 13/161,559", Mailed Date: Aug. 15, 2014, 19 Pages.
"Notice of Allowance Issued in U.S. Appl. No. 13/161,559", Mailed Date: Mar. 14, 2016, 16 Pages.
"Notice of Allowance Issued in U.S. Appl. No. 13/161,559", Mailed Date: May 20, 2016, 13 Pages.
"Office Action Issued in Chinese Patent Application No. 201280029539.9", Mailed Date: Oct. 10, 2015, 16 Pages.
"Office Action Issued in Chinese Patent Application No. 201280029539.9", Mailed Date: May 26, 2016, 14 Pages.
"International Search Report Issued in U.S. Appl. No. PCT/US12/40957", Mailed Date: Feb. 1, 2013, 9 Pages.
Quigley, et al., "PHP and MySQL by Example", Pearson Education, Inc, Jan. 2009, 84 Pages.
"Third Office Action and Search Report Issued in Chinese Patent Application No. 201280029384.9", Mailed Date: Sep. 23, 2016, 16 Pages.
"Office Action issued in Chinese Patent Application No. 201280029384.9", dated Mar. 8, 2017, 6 Pages.

* cited by examiner

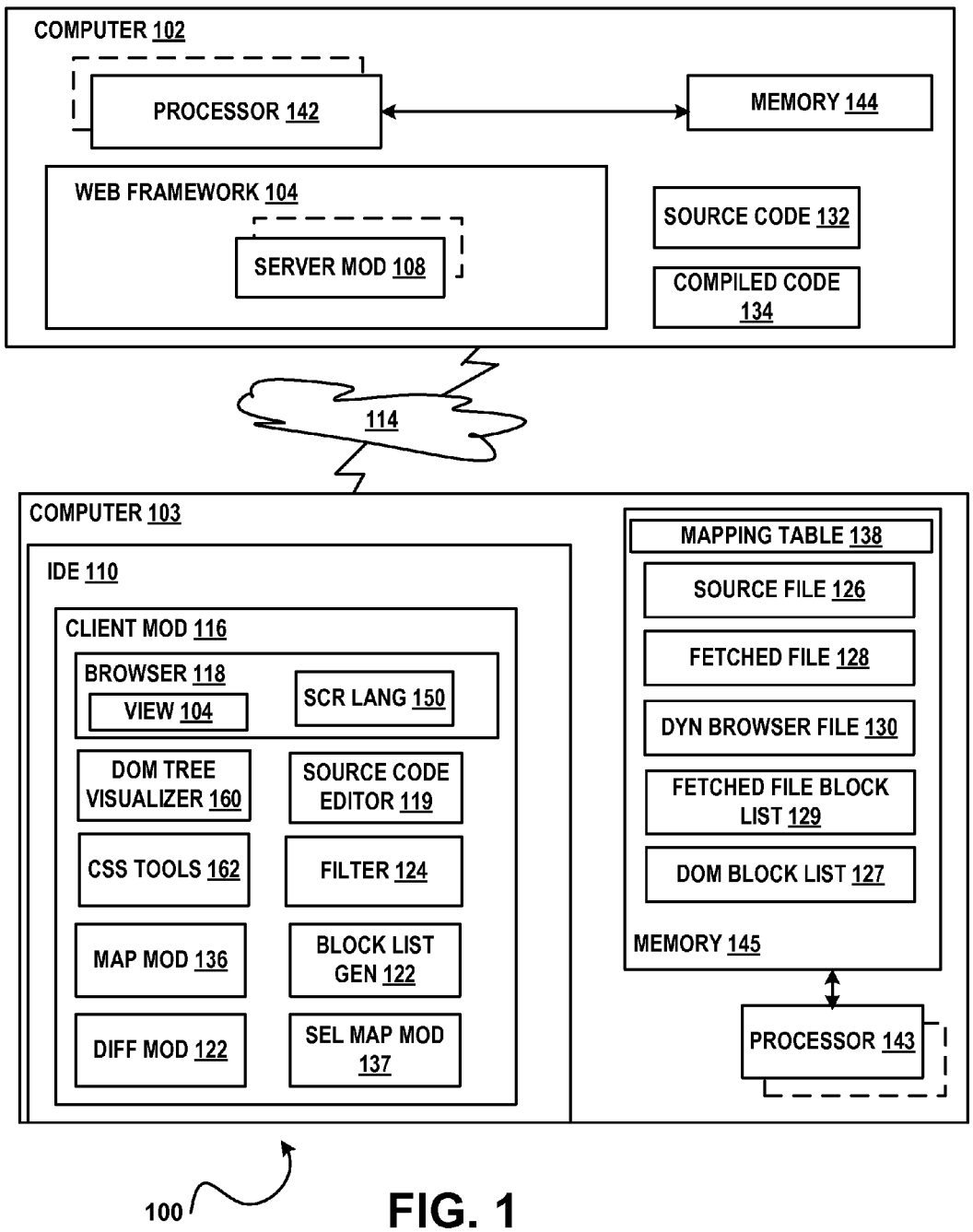

LIVE BROWSER TOOLING IN AN INTEGRATED DEVELOPMENT ENVIRONMENT

CROSS-REFERENCE TO RELATED APPLICATIONS

The application is related in subject matter to patent application, application Ser. No. 13/161,559, filed Jun. 16, 2011, entitled "SELECTION MAPPING BETWEEN FETCHED FILES AND SOURCE FILES" and patent application, application Ser. No. 13/161,539, filed Jun. 16, 2011, entitled "MAPPING SELECTION BETWEEN A BROWSER AND THE ORIGINAL FILE FETCHED FROM A WEB SERVER", filed herewith.

BACKGROUND

The World Wide Web has become a ubiquitous part of modern life. Correspondingly, web development is a burgeoning industry. Web development differs from traditional software development in several profound ways.

A complex web site can be made up of several different pages, whose content can be generated from many different files. Content can be divided up among the files in an infinite number of ways by a web developer who writes the code in the files that when processed by the web server and displayed in a browser results in the page a viewer sees. As the web server processes the files, it frequently generates additional content along the way. A few lines of code processed by the web server can be responsible for the generation of hundreds of lines of code in the final web page. When a client makes a request to a web server, the web server determines what files compose the response, assembles them into a single file, and sends the response back to the client. After a browser has loaded the documents received from the web server into the browser, a scripting language that adds interactive features to the web page may add, delete, or modify contents in the document.

The way web processing works affects web development. When a web developer wants to change part of a web site, the web developer has to know which of the files at the web server associated with the web site is the file that has to be changed. Furthermore, today, there is no way to know what the server generated content will be until the code has been processed by the web server and the client has received the response, so the web developer can only guess at the effect his changes will make. Scripting languages frequently run on HTML files to add application-like functionality to the static HTML documents. After a scripting language executes, the document presented by the browser differs from the original file that came from the server. There is presently no automated way to map an element selected in the browser back to the file received from the web server.

SUMMARY

A selection in a browser can be mapped to a location range in the source code file that generated it by mapping the selection to a location range in a fetched file and mapping the location range in the fetched file to a location range in a source file. A location range in a source file can be mapped to a selection in the browser by mapping the location range in the source file to a location range in the fetched file and mapping the location range in the fetched file to a selection in the browser.

A selection in a browser can be mapped to a location range in a fetched file by creating associations between the browser file and the original document that was fetched from the web server, mapping a browser selection to the browser file and using the associations between the browser file and the original fetched file to map the selection in the browser to the original document that was fetched from the web server.

A location range in a fetched file can be mapped to a location range in a source file that generated the fetched file by collecting metadata during generation of the fetched file. The metadata can be used to create a mapping table that can be used to map locations ranges in the fetched file to location ranges in the source file. This mapping table can also be used to map location ranges in the source file to location ranges in the fetched file. The associations between the browser file and the original fetched file can be used to map the location ranges in the fetched file to a selection in the browser. The modules that perform these tasks can be integrated into an IDE (integrated development environment).

When HTML code is generated on a web server in response to an HTTP request, the code can be augmented with metadata: information that maps snippets of HTML code back to a particular location in a particular source file. As the code that generates a file representative of the web page that a user can browse to executes on the web server, the mapping information can be injected into the generated file or can be transmitted to the client-side browser via another mechanism. Client-side mapping modules can receive the file from the web server, record the metadata and use the metadata to create a mapping table that maps location ranges from a fetched file to corresponding location ranges in the source files that originated the content. The client-side modules can provide a browsing experience that is integrated with development functionality and that runs within an IDE. Content can be rendered in a page under development by making a full round trip to the web server so that what is rendered and displayed to a developer is a production web server's response rather than a simulated interpretation of web server behavior.

A document object model (DOM) tool can provide a visualization of a tree data structure that represents the browser page. A Cascade Style Sheet (CSS) tool can map a selected style characteristic back to its source code file to allow a contemplated change to a style characteristic of an HTML element to automatically be made permanent by selecting the rule or property and changing the rule or property in the corresponding source file. A developer can also view a contemplated style change in the browser without applying the change to the source file.

The server-side mapping modules can be integrated with a web framework so that the web framework can collect mapping information that is sent from the server to the client in response to an HTTP request from the browser on the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1 illustrates an example of a system 100 that provides live browser tooling in an IDE in accordance with aspects of the subject matter disclosed herein;

DETAILED DESCRIPTION

Overview

Figure 2A:
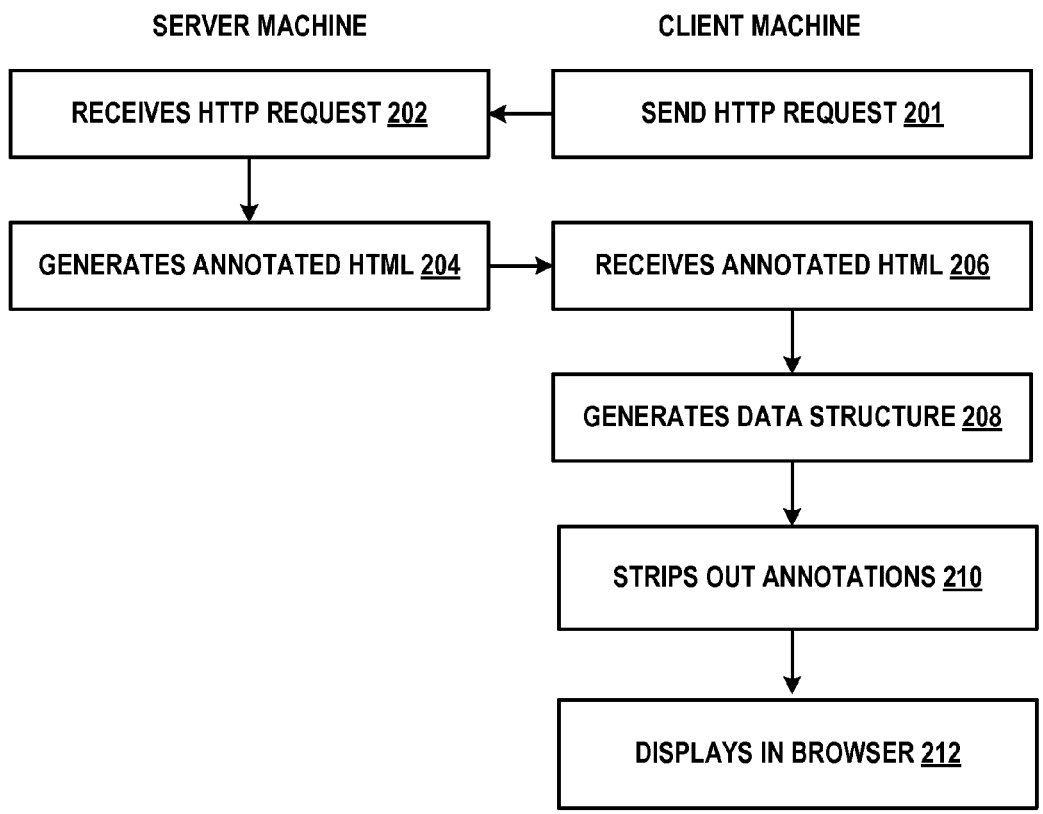
FIG. 2a illustrates an example of a method 200 for mapping between fetched and source code files in accordance with aspects of the subject matter disclosed herein.

In web development, (and in particular in frameworks such as Microsoft's ASP.NET), many different source files can be combined to form the page a user can browse to on the Web. For example, a web site may have a number of pages listed in a menu bar on the web site such as "Home", "About", "Contact us" and so on. The code for the menu bar may exist in one source file, the "About" page in another source file and so on. When a user browses to the website, all the source files may come back to the user's browser as a single file such as for example, a file called "About.htm" or a file called "Contact.htm".

A developer who wants to change something on the web site has to know in what file the element that he wants to change is located. Frequently, finding the file to change becomes a non-trivial task because, for example, there are many different ways a web developer can choose to divide the content of the website and because information can be extracted from databases rather than be coded into the source. Thus a developer may be forced to manually execute "find in files" commands, look through code or rely on remembering where the element can be found.

In accordance with aspects of the subject matter disclosed herein, any element, character or location range selected in the browser can be mapped to the source code that generated it and any location range selected in the source code can be mapped to what the source code generates in the browser. Developer source code which is compiled (e.g. into an assembly, binary, executable, etc.) can be instrumented either during compilation or at a later time, with calls that when executed emit metadata that maps a snippet of code back to a particular source file and to a particular location in the source file. Instrumented calls can be inserted in interpreted source code files that when interpreted emit metadata that maps a snippet of code back to a particular source file and to a particular location in the source file. The metadata can include injected symbols that specify that the information from a particular start position to a particular end position in the HTML comes from a particular start position to a particular end position in the source file.

Source files can be compiled together on a developer machine and uploaded to the server to form the code that is run when a user navigates to a web site. When a page of a web site is browsed to, a file is generated by the server and is fetched by a browser on a user's computer. When a user navigates to the server, the server can execute methods within the executable code. The executable code can be instrumented in such a way that as the server code builds the HTML file that the browser will get, the metadata showing where each piece of the HTML file came from in the source code can be collected. The metadata can be included in the HTML file or can be sent separately. The file that is fetched by the browser thus may include metadata that the browser does not need to display to the user. Therefore, when the browser gets the HTML file, the metadata can be removed from the file that the browser uses to display the website content. The metadata can be persisted to a data structure in memory. The data structure can be used to map selections within the browser back to the source files and can be used to map selections in the source files to the fetched file.

Mapping browser selections back to the HTML file fetched from the server is made more difficult because scripting languages such as Javascript, Microsoft's JScript®, Actionscript, Apple script, VBscript, and so on may run in the browser. Scripting languages can change the HTML that was fetched from the server. HTML generates static documents comprising text, lists, tables and hyperlinks. Scripting languages can provide an application-like experience using HTML as the presentation language by adding, deleting, changing and moving HTML elements. The scripting language does this by changing the data structure that represents the document viewed in the browser. In accordance with aspects of the subject matter disclosed herein, a copy of the original file received from the server can be maintained. Words and elements in the original file can be assigned identifiers. As a scripting language executes, changes to the underlying HTML can be compared to the original HTML received from the web server. A block list for the HTML file and a block list for the DOM can be created where identical blocks have identical identifiers so that if an element in the data structure moves as a result of the execution of the scripting language, the element can still be mapped to the original HTML received from the web server. As the scripting language changes the document, a differencing algorithm can be run to allow user selections in the browser to be mapped to the original fetched file.

The combination of the features described herein enables selections in the browser to be mapped to corresponding locations in the source code. A source code selection can be mapped back to what that section of source code eventually generates in the browser. That is, the combination of mapping between selections in the browser to the source files on the developer's machine and vice versa provides the ability for a developer to access a source code file for an element in a web page with a user action selecting the element. For example, suppose a developer wants to change a telephone number in a contact page on a web site. The developer can open up the IDE, use a view command in the client-side browser on the client computer to bring up the browser, open the browser, navigate to the contact page, and use a DOM (Document Object Model) inspector tool to select the telephone number in the contact page. The source file for the contact page can be displayed adjacent to the browser display so that the HTML code that generates the browser page can be viewed concurrently with the web page in the browser. The view of the source code can be scrolled to the position in the source file corresponding to the selection in the browser. For example, the client side modules can take the user to the Contact page and to the exact position in the Contact file where the telephone number is hardcoded or where the command that accesses the telephone number in a file or database is found. A selection in the source file can be mapped to a location range in the browser by mapping the selection in the source file to a location range in a block list generated from the fetched file. The location range in the fetched file can be mapped to a location range in a block list generated from a dynamic browser file (e.g., the DOM) responsible for generating a selection in the source file.

In response to receiving a user input changing the telephone number in the source file, the file can be saved, the site rebuilt and the code uploaded to the server. Moreover, the client-side mapping modules can tell the developer if the page on the browser matches or does not match the source code. (In contrast, known browsers do not know if the browser is running the latest version of the file or if it is not.) By selecting an option displayed on the screen, the source file that corresponds with the displayed web page can be retrieved and can show the most current version of the source file.

The client-side mapping modules can include a DOM (Document Object Model) tree visualizer tool that creates elements from the HTML and can display a graphical representation of elements of the HTML page. Another aspect of web pages is the way the page looks. The way a page looks is referred to as its style and includes the colors, sizes, layout, fonts and so on used in the page. The style of a page is determined by Cascading Style Sheets (CSS). Styles can be defined in multiple places including but not limited to somewhere in the document, right next to the element, in a separate CSS file and so on. In accordance with aspects of the subject matter described herein, a CSS tool associated with the browser can analyze a styling for a particular element in a page.

For a particular tag (HTML element) the CSS tool can display all the styles applied to that element in a grid form. The CSS tool can display aspects of styling including color, size, margins, font size, padding, bold, italic, etc. in a tool pane displayed, for example, under the browser display. When a change is made in the styling values, the changes can be reflected in the browser right away by changing a live DOM file. Moreover, the styles can be mapped from the grid displayed by the CSS tool to the source file that defines the style for that element. For example, if color is defined for a particular element in a particular source file, the client side mapping modules can determine the identity of the source file in which the color for the element is defined. The exact location in the document or in the file where that particular style was defined can be provided. By selecting the property of the element that defines the characteristic to be changed, or by selecting the rule that defines the characteristic to be changed, the client side mapping modules can determine and display the location in the source file where the developer can make the change by changing the source file. CSS rule mapping can be achieved by generating a unique identifier for each CSS rule in the original fetched file and using the unique identifiers to map the DOM rule back to its original source. The project system can be used to associate the run-time URL to the original project path on a developer machine.

Selection mapping from live DOM files used by the browser to display a particular page to source files can send input to the server and receive output from the server (called herein a round trip through the server). Because a significant amount of processing can occur on the server it can be a challenge to determine what the outcome of a developer's changes will be. For example, HTML code may define an item in an order but until the order is processed at the server, no one can know what the resulting page will look like because it depends on server processing such as how many items are ordered and so on. Previous development software has provided design views that attempt to simulate on the development computer what the file is going to look like in the browser after the server performs its server-side processing.

Because the development computer typically lacks access to information on the live server, and does not perform the server-side processing, the development simulation is often not very close to the appearance of the page when the processing occurs on the server. In accordance with aspects of the subject matter disclosed herein, data is requested from the web server. The development files are sent to the web server, the web server processes the files and returns results to the development machine. An HTTP request can be performed so that the development machine can display an outcome that is faithful to an actual customer experience. To rephrase, instead of rendering the content of a current page in a browser in an IDE, a full round trip to the server is made so that what is rendered to the developer is the same as what the server would provide to a user viewing the web page.

To achieve selection mapping, a mapping table based on the metadata generated on the web server computer can be created. The mapping table can map portions of the file received by the client from the web server (i.e., the fetched file) in response to an HTTP request from the browser to a source file. Each portion of the file can be identified by assigning an identifier, which is based on the metadata, to each section of the file. In response to detecting a selection event that selects an identified portion of the file, the selected portion of the file can be mapped back to the fetched document and back to the source files, thereby enabling a user to get the page's contents via a round trip to the server and to map the live browser's contents back to the source files.

Live Browser Tooling in an IDE

FIG. 1 illustrates an example of a system 100 for providing live browser tooling in an IDE in accordance with aspects of the subject matter disclosed herein. All or portions of system 100 may reside on one or more computers such as the computers described below with respect to FIG. 3. System 100 may execute in whole or in part on a software development computer such as the software development computer described with respect to FIG. 4. All or portions of system 100 may execute within an IDE such as IDE 104. IDE 104 can be an IDE such as the one described with respect to FIG. 4 or can be any other IDE. All or portions of system 100 can execute outside of an IDE. All or portions of system 100 may be implemented as a plug-in or add-on.

System 100 may include one or more computers or computing devices such as a computer 102 comprising: one or more processors such as processor 142, etc., a memory such as memory 144, and one or more server-side modules for providing server-side processing supporting live browser tooling in an IDE such as server module 108, etc. System 100 may also include one or more computers or computing devices such as a computer 103 comprising: one or more processors such as processor 143, etc., a memory such as memory 145, and one or more client-side modules for providing live browser tooling in an IDE such as client modules 116. Other components well known in the arts may also be included but are not here shown. It will be appreciated that one or more server modules such as server module 108, etc. can be loaded into memory 144 to cause one or more processors such as processor 142 to perform the actions attributed to the one or more server-side modules. It will be appreciated that one or more client-side modules such as one or more of client modules 116 can be loaded into memory 145 to cause one or more processors such as processor 143 to perform the actions attributed to the one or more client-side modules.

Computer 102 can represent a web server computer that delivers Web pages and other documents to browsers using the HTTP protocol. Computer 102 can include one or more of a web framework such web framework 104. Web framework 104 can be a web framework such as but not limited to ASP.NET, PHP, PERL, Ruby, etc. A server portion of a system that provides live browser tooling according to aspects of the subject matter disclosed herein is represented in FIG. 1 by server module 108, etc. Server module 108, etc. can be a plug in or add in to a web framework. Source code 132 and/or compiled code 134 can be received by the server module 108, etc. and can be used to generate an HTML file that is sent from the server computer 102 to the client computer 103 in response to an HTTP request from a browser such as browser 118.

A server module 108 can generate an HTML file (the "fetched file") to be sent to a client computer such as client computer 103. The server module 108 can emit information concerning the source files from which sections of the HTML file are generated. Information concerning the source files can be returned to the client computer. For example, information can be returned by embedding it in the HTML file sent to the client or the information can be sent in a separate file. Whether or not the metadata is included in the HTML file sent to the client computer, is sent separately or is not sent at all can be controlled by web site configuration settings, HTTP headings information, query string information, form data and so on.

The server module 108 can generate metadata that associate positions in an annotated HTML file with sections of source code in source code files. For example, an XML table can be used to store both source and destination positions. Alternatively, tokens can be used to associate location ranges in an HTML file with sections of source code files and so on. In accordance with some aspects of the subject matter disclosed herein, a server module 108 can generate start and end tokens that together define a range of locations in the HTML file generated by the server computer 102 that come from a particular location in a particular source file. It will be appreciated that the format of the tokens can be any suitable format. For example, one format can be $startToken$ and $endToken$. The $startToken$ can be used to delimit a start position in the HTML file and the $endToken$ can be used to delimit an end position in the HTML file for the section of HTML code under consideration. Each start token/end token pair can be assigned a sequential number or other identifier to distinguish one pair of start and end tokens from another pair of start and end tokens.

After the server is done generating the requested file, the context data can be generated. Any data structure can be used to expose the context information. One way of exposing the context data is an XML formatted data structure that can be used as a mapping table and includes data needed to associate sections in the HTML file with sections of the source. For example, a table of ranges in the source file that correspond to the range of locations in the HTML file delimited by start and end tokens can be included. In accordance with some aspects of the subject matter disclosed herein, the context information can be included at the end of the HTML file sent to the client computer. Each pair of start and end tokens can be identified by an identifier that identifies that particular pair of start and end tokens, (e.g., an identifier that is unique to that pair of start and end tokens) to enable mapping between locations in the HTML file and locations in a particular source file from which the HTML snippet was generated, by matching identifiers.

For example, for a 10-character range in a fetched file that starts at position 50, which is mapped to a 10-character range in a source file that starts at position 0, a selected position 58 in the fetched file, which falls within the 10-character range, can be mapped to the source file as follows: the fetched range's start position can be subtracted from the selected position, and the result can be added to the start position of the range in the source file. In this case, 58−50+0=8, where 8 is the selected position in the source file. The same operation can be performed for start and end positions of a selected range within the fetched file to find the start and end of the corresponding range in the source file. One source location range can map to multiple location ranges in the HTML file generated by the server computer 102. One range in one source file can include ranges in another source file so that a single location in a fetched file can map to multiple source files. For example, a source file can include a command to include another source file at the current location.

Content in the HTML that is generated by the server can be identical, character for character to the content in the source file. This type of content is called literal content. Literal content can be, for example, HTML. Content in the HTML that is generated by the server can be different from content in the source file. This type of content is called nonliteral content. Nonliteral content can be code in the source file that is run to produce HTML in the HTML file generated by the server. The metadata that is produced by the server can include the following context information: an identifier that is used to map source to fetched files, a start position in the source file, an end position in the source file or alternatively, a length in the source file, the name or path for the source file (where the output originated from), an indicator that indicates whether the content is literal or nonliteral content, a start position in the fetched file, an end position in the fetched file or alternatively, a length in the fetched file. This information makes translation from fetched file to source file possible.

FIG. 2a illustrates an example of a method 200 for mapping between browser and source code files in accordance with aspects of the subject matter disclosed herein. The method described in FIG. 2a can be practiced by a system such as but not limited to the one described above with respect to FIG. 1. Some of the actions described below can be optional. Some of the actions described below can be executed in a sequence that differs from that described below. At 201a browser can send an HTTP request to a web server such as web server computer 102 requesting a particular web page. At 202 the web server running server-side browser modules can receive the HTTP request and in response at 204 can generate a response comprising an HTML file and mapping metadata. The generated HTML file, in accordance with some aspects of the subject matter described herein, may include annotations that delimit location ranges of each output element in the HTML file. The web server computer can generate metadata comprising a mapping table that includes the context data for each annotated element in the HTML file. The web server can send the annotated HTML file and the metadata to the client. At 206 the client file can receive the annotated HTML file and the metadata. The metadata can be embedded in the HTML or can be sent separately. At 208 the metadata can be used to generate a data structure that can be used to map between fetched and source code files and between source and fetched files. At 210 the annotations can be stripped out of the HTML file and the resulting dynamic browser file can be passed to the browser for display at 212. The dynamic browser file can be represented as a DOM.

Computer 103 can represent a client computer that hosts a web browser (e.g., browser 118). Browser 118 can be any browser including but not limited to Mosaic, Microsoft's Internet Explorer®, Mozilla, Netscape, Firefox and so on. A web browser is a software application for retrieving, presenting, and traversing information resources on the World Wide Web. An information resource is identified by a Uniform Resource Identifier (URI) and may be a web page, image, video, or other piece of content. Computer 103 can represent a software development computer. Computer 103 can host an IDE 110 that includes one or more client modules 116, etc. for live browser tooling in an IDE in accordance with aspects of the subject matter disclosed herein. The one or more client modules 116, can include one or more of: a browser 118, a mapping module 136, a DOM tree visualizer 160, CSS tools 162 and/or filter 124. System 100 can also include any or all of the following: a mapping table 138, one or more source files (represented in FIG. 1 by source file 126), a fetched file 128 and/or a dynamic browser file such as live DOM 130. The Document Object Model (DOM) is a cross-platform, language-independent convention for representing and interacting with objects in HTML, XHTML and XML documents. DOM elements can be addressed and manipulated by programming languages including scripting languages such as but not limited to JScript. DOM supports navigation in any direction. That is, DOM supports navigation from a child to its parent, from a parent to its child and from a child to a previous sibling. Computer 103 may also include a web server component (e.g., a web framework and one or more server modules analogous to server module 108) (not shown). Computer 102 and 103 can be connected via a network 114.

A browser 118 can send an HTTP request to a web server such as web server computer 102. Alternatively the request can be sent to a web server on computer 103. The HTTP request can be a request for a page of a web site. The HTML file that is requested can be an annotated HTML file as described herein. Metadata can be sent separately or can be embedded within the annotated HTML file. Additional metadata can be provided that eliminates the need for annotations within the HTML file. In response to receiving the HTTP request, a web server computer 102 can generate an HTML file in which metadata mapping location ranges in the HTML to corresponding location ranges in a source file is injected. The annotated HTML file can be sent to the client computer 103. Alternatively, the metadata can be sent in a separate file. One or more modules of client modules 116 can receive the annotated HTML file, fetched file 128, can strip out the metadata and/or annotations, can build a mapping table 138 from the metadata, and can generate a file for the browser without the metadata.

The file generated from the fetched file which the browser uses to derive and display a web page is called a dynamic browser file and can be converted to a DOM such as DOM 130. Alternatively, metadata can be sent separately. In response to receiving the HTTP request, a server module can generate an HTML file and a metadata file in which metadata mapping each output element in the fetched file to a corresponding location in a source file is provided. The HTML file and the metadata file can be sent to the client computer 103. Client module(s) 116 can receive the HTML file, (e.g., fetched file 128) and the metadata file. Mapping module 136 can build a mapping table 138 from the metadata, and can provide the HTML file to the browser. Mapping module 136 can map between the dynamic browser file or DOM 130 and the source file 126 using the mapping table 138, by matching identifiers as described more fully above. Browser 118 can concurrently display adjacent to the browser display a source code file (e.g., source file 126 in a source code editor (e.g., source code editor 119)) for the page that is being displayed in the browser 118 based on information in the mapping table 138.

Computer 103 can host an IDE 110 that includes the one or more modules that map between a selection in a browser and the file fetched from a web server (e.g., selection mapping module 137) in accordance with aspects of the subject matter disclosed herein. Selection mapping module 137 can include a filtering module. Alternatively, the filtering module such as filter 124 can be external to selection mapping module 137. Selection mapping module 137 can include a differencing module. Alternatively, the differencing module such as differencing module 120 can be external to selection mapping module 137. Selection mapping module 137 can include a block list generating module. Alternatively, block list generating module such as block list generating module 122 can be external to selection mapping module 137. IDE 110 can include one or more of: a browser 118, a layout engine (not shown) and/or a scripting language 150 that executes on the file rendered in the browser. IDE 110 can include a source code editor such as source code editor 119.

System 100 can also include any or all of the following: a fetched file such as fetched file 128, a dynamic browser file such as DOM 130, a block list derived from the fetched file such as fetched file block list 129, and a block list derived from the DOM such as DOM block list 127. Browser 118 can send a request (e.g., an HTTP request) to a web server for a page of a web site. In response, the browser 118 may receive a web page from the web server. The web page may be an HTML file. The file that is received by the browser 118 can be stored in memory 145 as fetched file 128. As the HTML file is received from the web server, in accordance with some aspects of the subject matter described herein, a module such as filter 124 may assign an identifier to each element in the HTML file so that each different element is assigned its own identifier. Words can also be assigned identifiers. An element in an HTML file is delimited by the presence of an HTML start tag and an HTML end tag pair. Filter 124 may be a MIME (Multipurpose Internet Mail Extension) filter that operates on MIME type "text". It will be appreciated that alternatively, an identifier may be assigned to each element in the HTML file at another time before the scripting language runs (e.g., after the HTML file is rendered in the browser).

The identifier enables elements in the DOM to be mapped to elements in the fetched file and vice versa, even if a scripting language runs and elements are moved around or changed. It will be appreciated that elements that are deleted cannot be mapped. Similarly, an element that is inserted in the DOM cannot be mapped to a corresponding element in the fetched file because it is not in the fetched file. The HTML fetched file 128 can be parsed into a Document Object Model (DOM) such as DOM 130. The Document Object Model (DOM) is a cross-platform, language-independent convention for representing and interacting with objects in HTML, XHTML and XML documents. DOM elements can be addressed and manipulated by programming languages including scripting languages such as but not limited to JScript. DOM supports navigation in any direction. That is, DOM supports navigation from a child to its parent, from a parent to its child and from a child to a previous sibling.

The DOM 130 created from the fetched file 128 can be stored in memory 145 and can be used by the layout engine to display a view of the web page such as view 104 in the browser 118. The DOM 130 can be modified by execution of a scripting language. Thus, DOM 130 may change over time and is dynamic. When the browser 118 first presents the web page fetched from the server, the view 104 corresponds to the fetched file 128. Conversion of HTML into a DOM enables a scripting language to execute within the browser 118. A scripting language such as JScript may execute. When the scripting language executes, the scripting language can change the DOM. When the DOM changes, the view 104 can change in the browser. Thus, as soon as the scripting language executes, the fetched file will no longer reflect the current view. When the DOM changes, a corresponding change is reflected in the view 104.

A block list generating module such as block list generating module 122 can generate a block list (e.g., DOM block list 127) from the DOM 130. A block list generating module such as block list generating module 122 can generate a block list (e.g., fetched file block list 129) from the fetched file 128. A differencing module such as differencing module 120 can be run on the fetched file block list 129 and the DOM block list 127 to map between block lists even if the DOM no longer reflects the fetched file. The processing performed by differencing module 120 is described more fully below.

Thus, in accordance with aspects of the subject matter disclosed herein, as the scripting language changes the DOM data structure underlying the view 104 in the browser 118, a differencing algorithm can be run on the block lists for the DOM and the fetched file to handle mapping changes in the block lists. The DOM block list 127 can change to reflect changes made by execution of the scripting language.

Figure 2B:
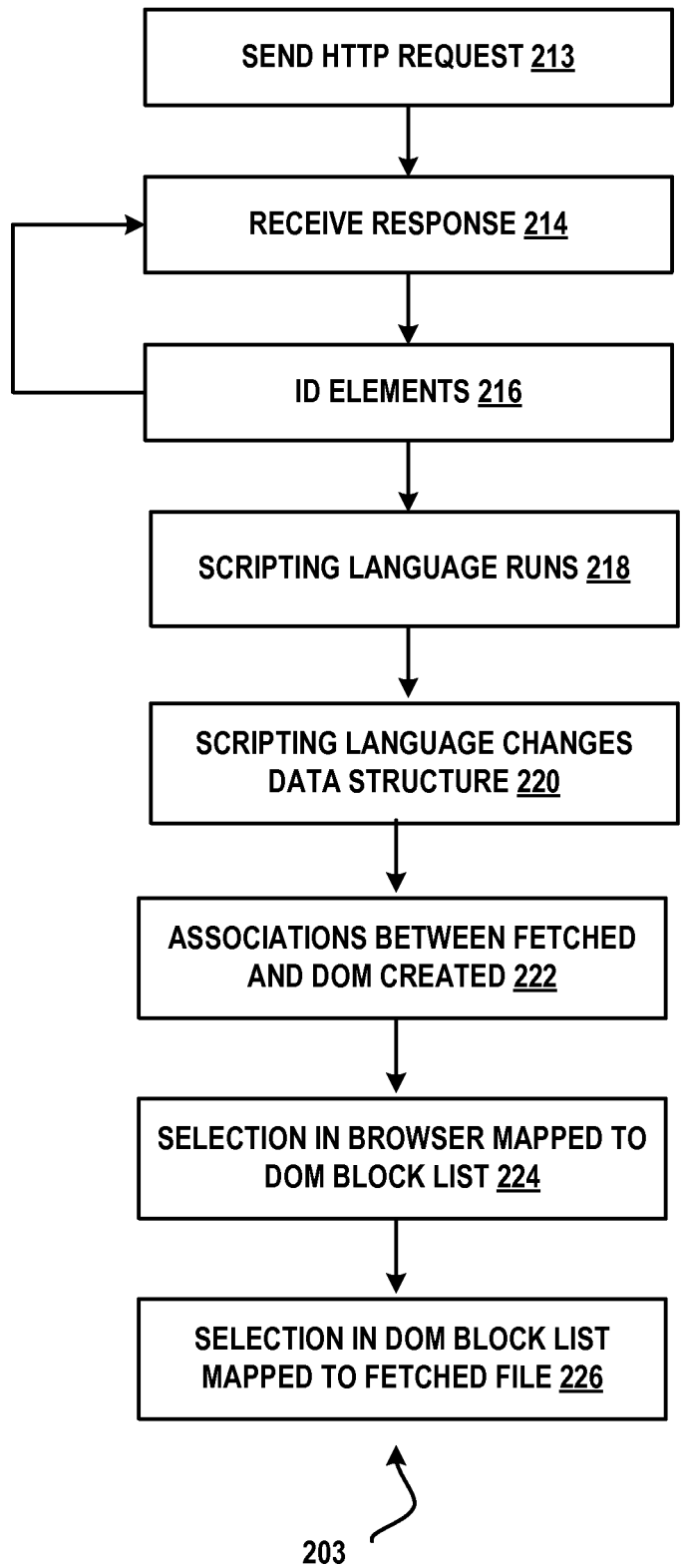
FIG. 2b illustrates an example of a method 203 for mapping between browser and fetched files in accordance with aspects of the subject matter disclosed herein.

FIG. 2b illustrates an example of a method 203 that maps a selection in a browser to a file fetched from a web server in accordance with aspects of the subject matter disclosed herein. The method described in FIG. 2b can be practiced by a system such as but not limited to the one described with respect to FIG. 1. Some of the actions described below can be optional. Some of the actions described below can be executed in a sequence that differs from that described below.

At 213 a browser can send a request such as an HTTP request to a web server. At 214 the browser can receive the requested file from the web server. The file received by the browser in response to the browser request is referred to herein as the fetched file. The fetched file can be an HTML file. The fetched file can be loaded into memory. At 214, as the fetched file is received, elements in the HTML file can be assigned identifiers at 216 such that each different element is assigned its own identifier. The HTML file can be converted to a DOM and rendered by the browser. During execution, at 218 a script language such as but not limited to JScript may run on the DOM. The script language may change the DOM as it executes at 220. At 222 associations between the DOM and the fetched file can be generated by matching block identifiers as described more fully below. At 224 in response to user input selecting a portion of the document displayed in the browser, the selection can be mapped to a portion of the DOM. At 226 the portion of the DOM can be mapped to a section of the fetched file.

Figure 2C:
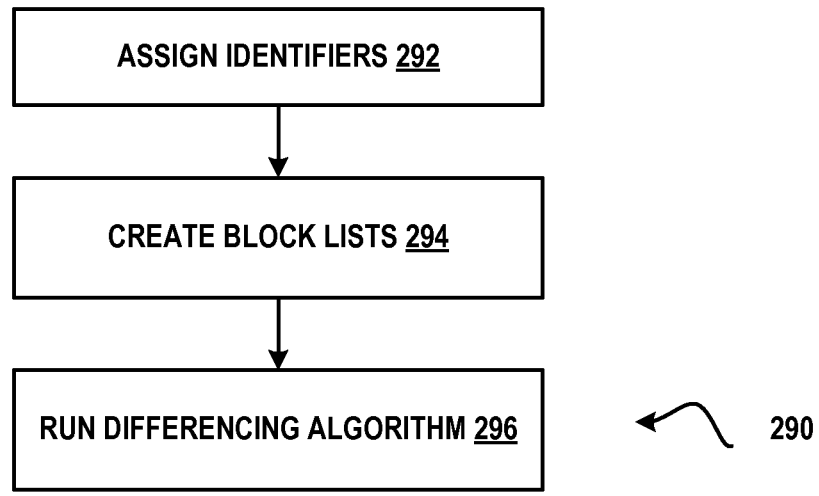
FIG. 2c illustrates an example of a method 290 that creates associations between location ranges in a DOM and location ranges in a fetched file in accordance with aspects of the subject matter disclosed herein.

FIG. 2c illustrates an example of a method 290 that creates associations between location ranges in a DOM and a fetched file in accordance with aspects of the subject matter disclosed herein. The method described in FIG. 2c can be practiced by a system such as but not limited to the one described with respect to FIG. 1. Some of the actions described below can be optional. Some of the actions described below can be executed in a sequence that differs from that described below.

At 292 a different identifier can be assigned to each element in the fetched file. An element can be identified by the presence of a start and end tag. At 294 a block list can be created from the fetched file. Another block list can be created from the DOM. To create a block list for the fetched file (an HTML file), the file can be parsed, and a block can be created for each start and end tag pair encountered in the HTML file. The identifier assigned to the element can be saved. A block can be created for each word in the HTML file. In accordance with some aspects of the subject matter described herein, a word can be assigned an identifier that is a hash of the word. Thus if a particular word is encountered more than once in an HTML file, each occurrence of the particular word would have the same identifier.

To create a block list for the DOM 294, the DOM can be converted to an HTML file and the process described above with respect to the fetched file can be used to generate the DOM block list. Alternatively, the DOM tree can be walked and a DOM block list as described above can be created therefrom. At 296 a differencing module can run a differencing algorithm such as a modified Heckel Diffing Algorithm on the two created block lists. The differencing algorithm can be run on the DOM block list and the fetched file block list. Each start and end tag in the HTML can be treated as a block. Thus a block can be created for every word and for every start or end tag pair in the fetched file and in the DOM. Because the same tag is frequently used more than once in an HTML document, a unique identifier can be assigned to each start tag (e.g., by setting an attribute of the corresponding element in the fetched file with a unique identifier). Words use their text as their identifier, and will therefore be non-unique if the same word exists more than once in the document. If a fetched file block has a unique identifier that matches a unique identifier of a DOM block, the two blocks are determined to be the same. Their association can be recorded. If the fetched file block has a non-unique identifier, such as is the case with text, but it exists adjacent to an associated block in the fetched file and a block with a matching identifier exists adjacent to the corresponding block in the DOM, the two blocks are determined to be the same block. Their association can be recorded. Repeated application of this process forward and backwards in the block list finds associations of unchanged blocks with non-unique identifiers. The recorded associations are used to map between the fetched file and DOM block lists and vice versa.

Figure 2D:
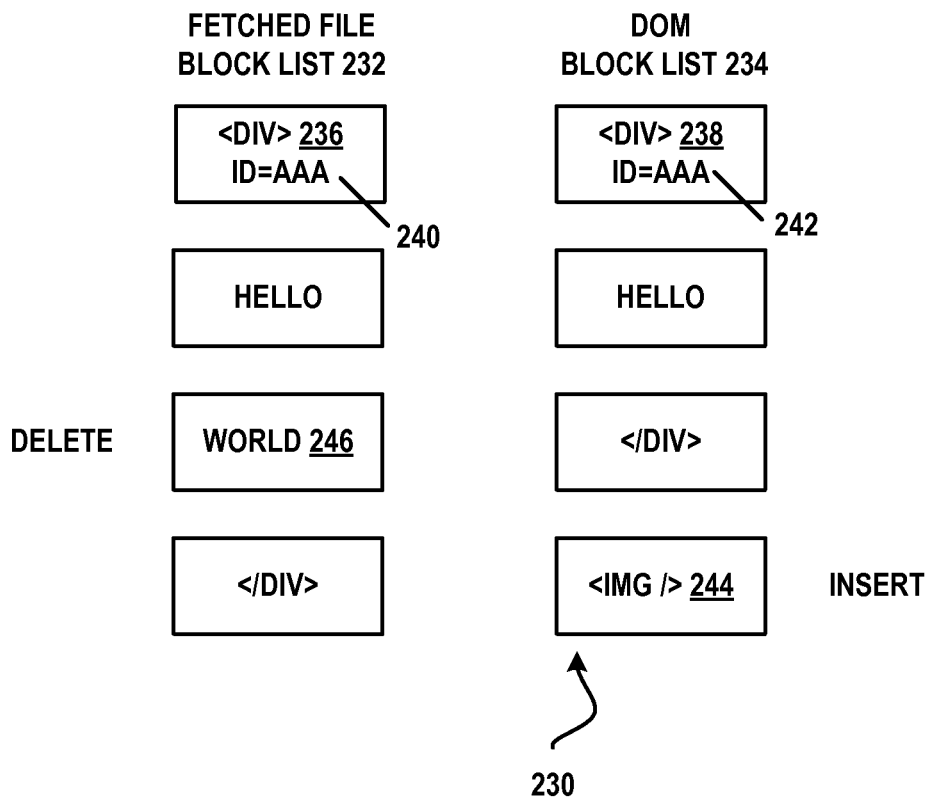
FIG. 2d illustrates an example 230 of a block list for a fetched file and a block list for a DOM in accordance with aspects of the subject matter disclosed herein.

FIG. 2d illustrates an example 230 of a block list for a fetched file (e.g., fetched file block list 232) and a block list for a DOM (e.g., DOM block list 234). Identical blocks in each file can be associated with each other using the assigned identifiers (e.g., the block identified by id=AAA 240 of the fetched file block list 232 maps to the block identified by id=AAA 242 in the DOM block list 234). For example, in FIG. 2c, block 236 in fetched file block list 232 is identical to block 238 in DOM block list 234. Block 236 can be mapped to block 238 and vice versa because the identifier 240 of block 236 is identical to the identifier 242 of block 238. Block 244 in DOM block list 234 does not map to a block in fetched file block list 232 because "<img/>" was added to the DOM after the fetched file was received. Block 246 ("WORLD") in fetched file block list 232 has no analogous block in the DOM block list 234 because "WORLD" was deleted in the DOM after the fetched file was received from the web server.

Blocks of text may lack identifiers (e.g., because text cannot have attributes) but blocks of text in the DOM block list can be mapped to blocks of text in the fetched file block list by assuming that unidentified blocks of text in both block lists following identified blocks with identical identifiers are identical blocks. For example, block 236 in fetched file block list 232 can be mapped to block 238 in DOM block list because the identifier id=AAA 240 in block 236 is identical to identifier id=AAA 242 in block 238.

Document selections in the browser can be mapped to the text of the dynamic browser file by determining which block in the block list for the DOM corresponds to the selection in the browser. When a selection event occurs in a browser such as Microsoft's Internet Explorer, Mozilla, etc., an object that includes the selected string and the selection context (i.e., a current position in the DOM) can be returned. To determine the block in the DOM block list that corresponds to the selection made in the browser, navigation from the current position in the DOM towards the beginning of the DOM can be conducted until a start tag with an identifier (e.g., ID=x) is found. The characters encountered in the backwards traversal until the start tag is encountered can be recorded. The corresponding block (i.e., the block with ID=x) in the DOM block list is accessed. The block list and the DOM are traversed in a forward direction until the location corresponding to the selection is encountered. Associations between the DOM block list and the fetched file block list can be used to map to the corresponding location in the fetched file.

Figure 2E:
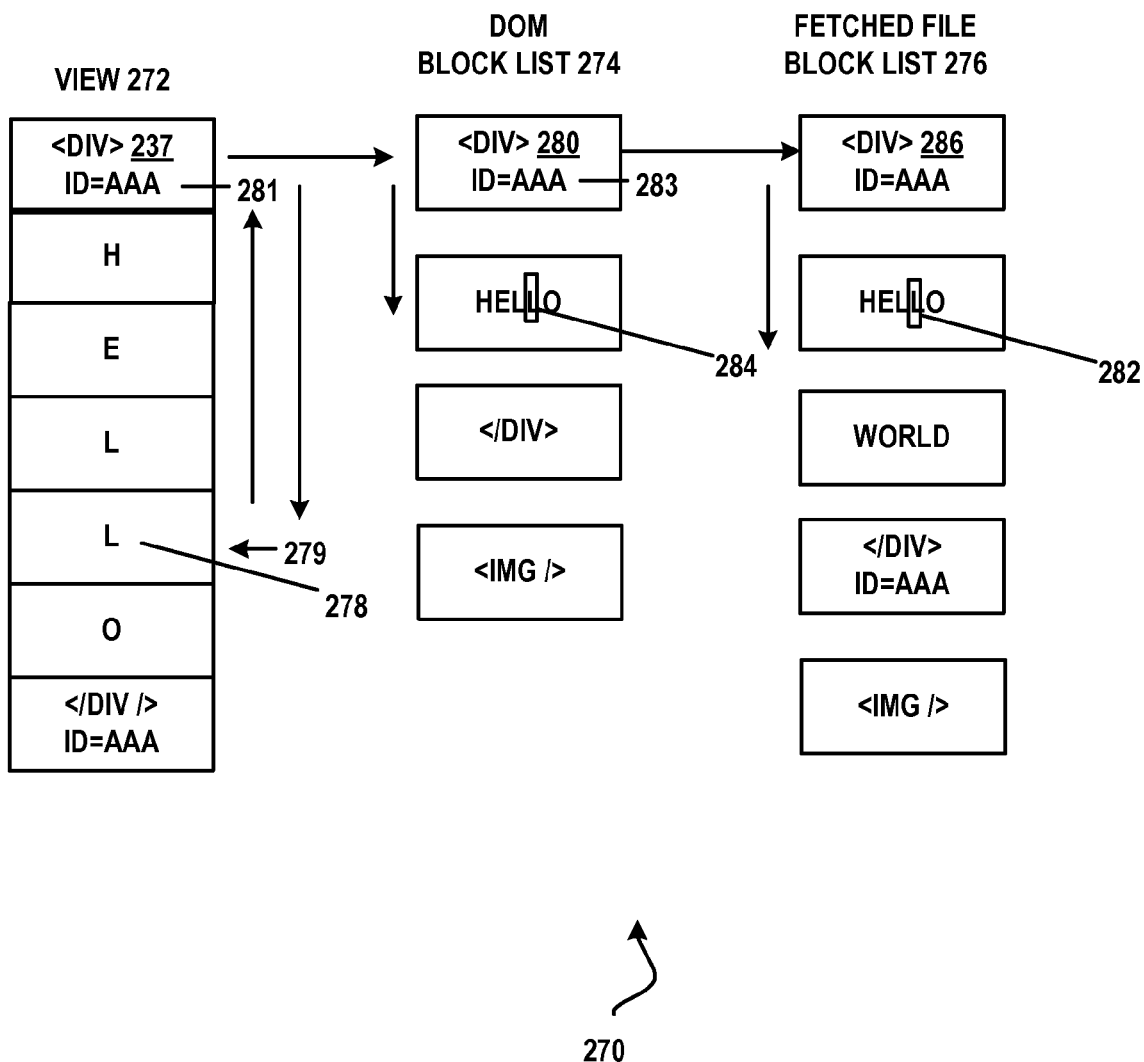
FIG. 2e illustrates an example 270 of mapping from a selection in the browser to the DOM block list and then to the fetched file.

FIG. 2e illustrates an example 270 of mapping from a selection (e.g., selected text) in the browser to the DOM block list and then to the fetched file. Suppose the following code is found in the file being viewed in the browser:

```
<div _ID="AAA">
    Hello
    <img src=".." />
</div>
```

Suppose the user selects the second letter "1" from the word Hello (selection 278) in the view. The selection event can return an object with the selected string and the selection position in the document. Starting from a current position 279 in the DOM (e.g., view 272), the DOM can be traversed, moving left in the data structure, upwards in FIG. 2d, towards the beginning of the DOM, until the first element that contains an ID that can map to the fetched document is found (e.g., to block 237). Along the way, the characters encountered can be recorded (i.e. in the example, "L", "L", "E", "H" and "<DIV>" may be recorded).

Using the identifier for the start tag (ID=AAA) 281 in block 237, the block in the DOM block list with ID=AAA 283, block 280 can be accessed. Both the DOM (view 272) and the DOM block list 274 are traversed in a forward direction until the recorded characters "<DIV>", "H", "E", "L", "L" have been encountered. The associations between the DOM block list 274 and the fetched file block list 276 can be used to map to map "L" 284 to "L" 282 in the fetched file.

Browser 118 can render content in a page under development by making a full round trip to the server so that what is rendered and displayed to a developer in the browser is a production server's response rather than a simulated interpretation of server behavior. As the fetched file 128 is generated by the server code metadata can be emitted and sent to the client computer. The metadata can be injected into the fetched file 128 or can be send separately. A filter such as filter 124 can be a pluggable mime filter that filters out the metadata from the fetched file (e.g. fetched file 128). The original file that is received from the server computer 102 can be changed by the execution of a scripting language such as scripting language 150 embedded in the browser 118.

A document object model (DOM) tool (e.g., DOM tree visualizer 160) can provide a visualization of a tree data structure that represents the browser page from fetched file. A Cascade Style Sheet (CSS) tool (e.g., CSS tool 162) can map a selected style characteristic back to its source code file to allow a contemplated change to a style characteristic of an HTML element to automatically be made permanent by selecting the rule or property and changing the rule or property. The mapping browser modules can automatically map the viewed change to the source file responsible for the element's appearance. A developer can also view a contemplated style change in the browser without applying the change to the source file.

Figure 2F:
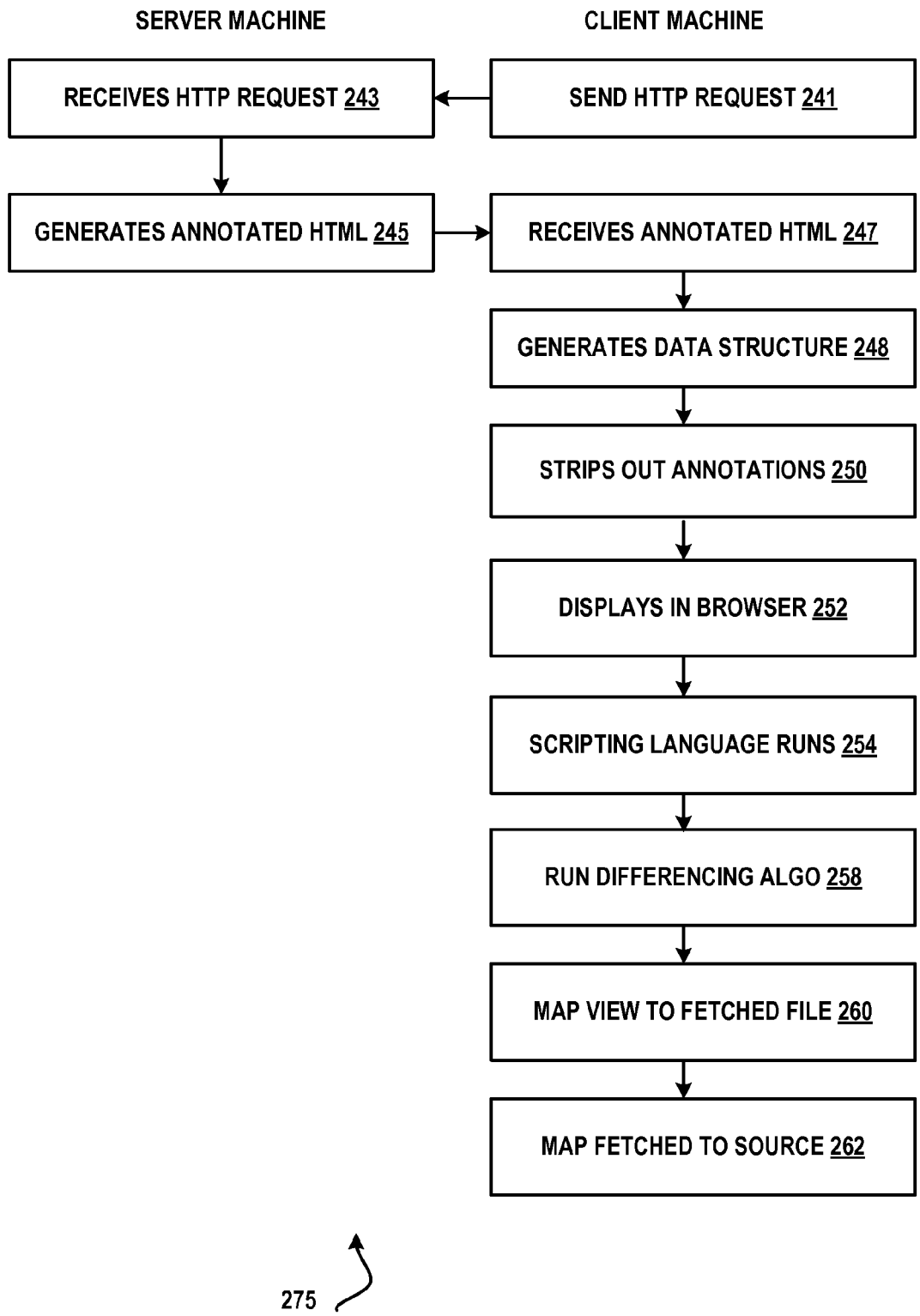
FIG. 2f illustrates an example of a method 240 for providing live browser tooling in an IDE in accordance with aspects of the subject matter disclosed herein.

FIG. 2f illustrates an example of a method 275 for providing dynamic browser tooling in an IDE in accordance with aspects of the subject matter disclosed herein. The method described in FIG. 2 can be practiced by a system such as but not limited to the one described with respect to FIG. 1. Some of the actions described below can be optional. Some of the actions described below can be executed in a sequence that differs from that described below.

At 241 a mapping browser can send an HTTP request to a web server such as web server 102 requesting a particular web page. At 243 the web server running server-side mapping browser modules can receive the HTTP request and in response at 245 can generate a response comprising an HTML file. The generated HTML file can include metadata that indicate the source file location of each output range in the HTML file. The web server can generate metadata comprising a mapping table that includes the context data for each annotated output range in the HTML file. The web server can send the HTML file with metadata to the client. At 247 the client side can receive the HTML file with metadata. At 248 the metadata can be extracted from the HTML file and can be used to generate a data structure (e.g., mapping table 138) that can be used to map between fetched and source code files and between source and fetched files. At 250 the metadata can be stripped out of the HTML file. The resulting file can be passed to the browser for display at 252. The resulting dynamic file can be converted to a DOM. During execution, at 254 a script language such as but not limited to JavaScript may run on the DOM. The script language may change the DOM as it executes.

At 258 associations between the dynamic browser file and the fetched file can be generated by matching block identifiers generated by a differencing algorithm run on the original HTML file (the fetched file) and the dynamic browser file, that can be a DOM. Each start and end tag in the HTML can be treated as a block. Thus a block can be created for every word and for every start or end tag in the fetched file and in the dynamic browser file. Because the same tag is frequently used more than once in an HTML document, a unique identifier can be assigned to each start tag/end tag pair (e.g., by setting a property of the corresponding object in the DOM to the unique identifier). A first block list can be generated for the fetched file and a second block list can be generated for the dynamic browser file. In response to determining that immediately adjacent to a unique block in the fetched file an identical block exists next to the corresponding unique block in the dynamic browser file, the two blocks are determined to be the same block. Repeated application of this process forward and backwards from unique blocks finds sequences of unchanged blocks. Identical blocks in the two files can be mapped to each other. That is blocks in the dynamic browser file can be mapped to the fetched file and vice versa. At 260 in response to user input selecting a portion of the document displayed in the browser, the selection can be mapped to a portion of the dynamic browser file. The portion of the dynamic browser file can be mapped to a portion of the fetched file. At 262 the portion of the fetched file can be mapped to the corresponding section of the source file.

Example of a Suitable Computing Environment

Figure 3:
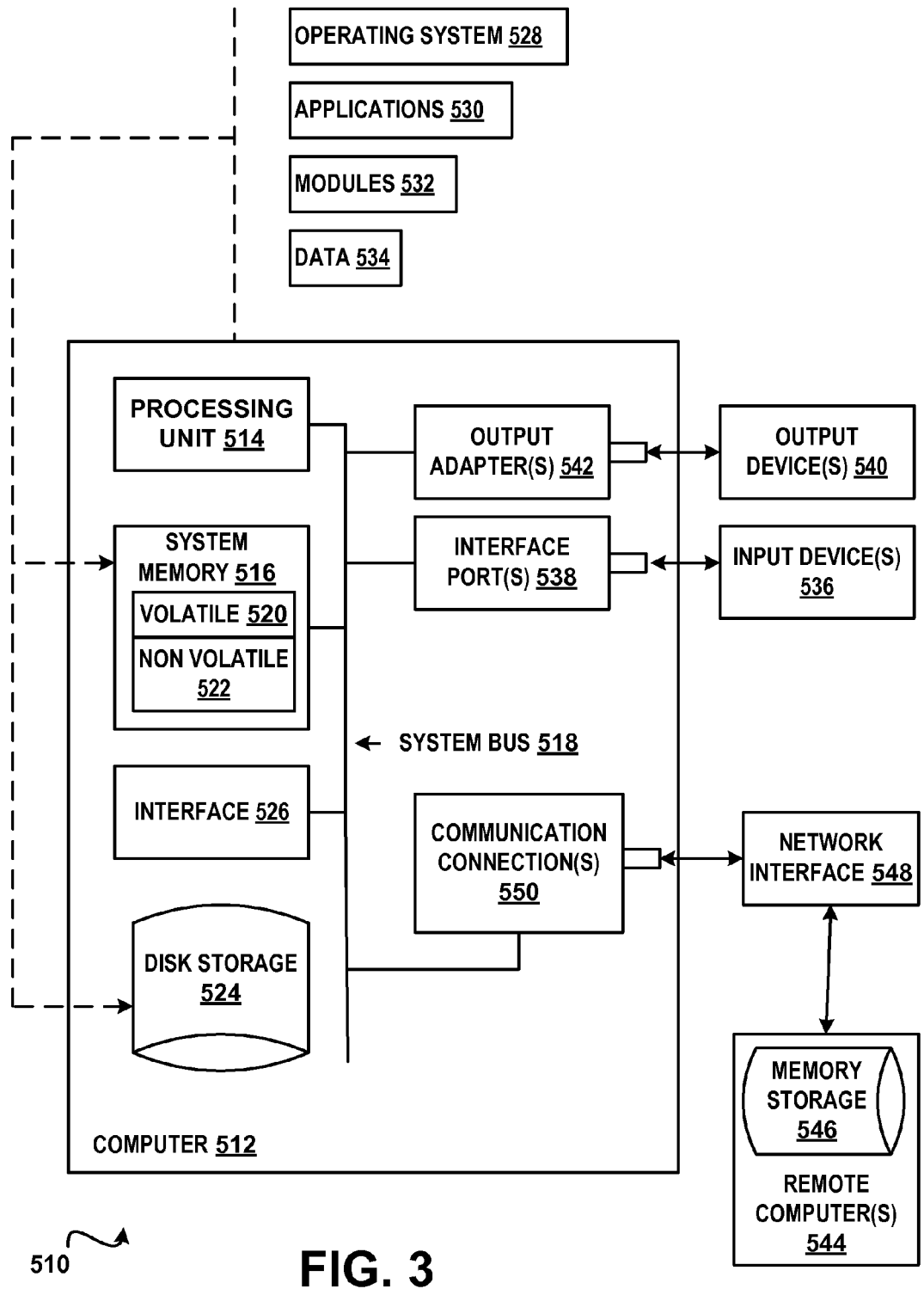
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
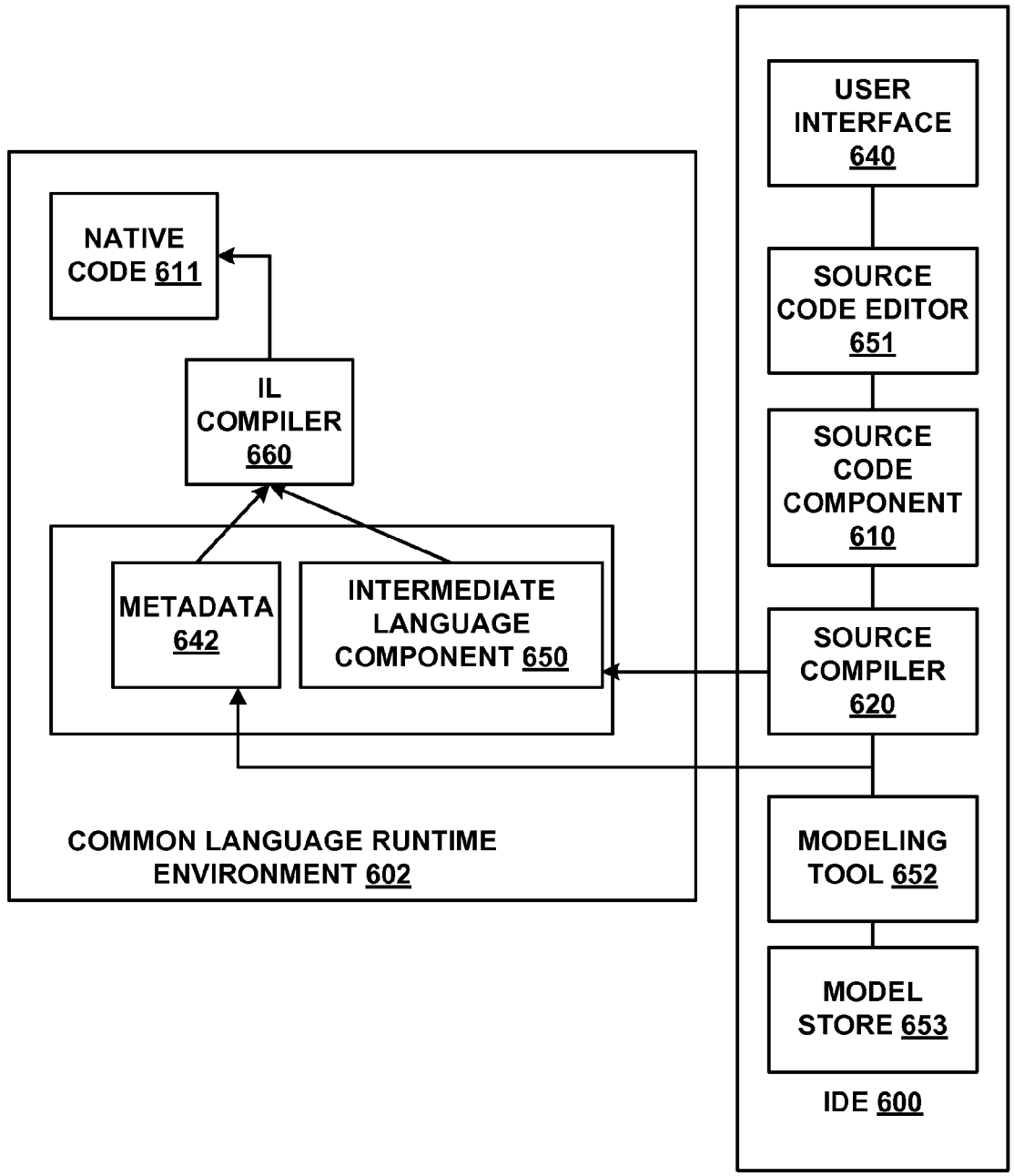
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module loaded into the memory causing the at least one processor to:
   map a selection in a browser to a portion in a document object model (DOM) corresponding to the selection, the DOM representing a fetched file obtained from a web server in response to an hypertext transfer protocol (HTTP) request, the selection associated with content from the fetched file, the fetched file differs from the DOM;
   map the portion in the DOM to a location range in a source file that generated the content in the fetched file;
   receive updated content from the web server based on alterations made to the source file; and
   display the selection in the browser concurrently with the altered source file,
   wherein the displayed selection in the browser includes the updated content.

2. The system of claim 1, wherein the at least one processor receives metadata that maps a location range in the fetched file to a particular location range in a particular source file, the metadata comprising a path for the particular source file and a start location in the particular source file.

3. The system of claim 2, wherein the at least one module generates a mapping table from the received metadata, the mapping table mapping location ranges in the fetched file to location ranges in a source file.

4. The system of claim 1, wherein the at least one module further comprises:
   map the selection in the DOM to a location range in a dynamic browser file block list;
   map the location range in the dynamic browser file block list to a location range in a fetched file block list; and
   map the location range in the fetched file block list to a corresponding location range in a source file that generated the selection in the DOM.

5. The system of claim 1, wherein a document object model tool provides a visualization of a tree data structure that represents a browser page, the browser page displayed in the browser.

6. The system of claim 1, wherein a Cascading Style Sheet tool maps a selected style characteristic back to a corresponding source file that originated the characteristic.

7. The system of claim 6, wherein a change to the selected style characteristic can be automatically made permanent by changing the corresponding source file.

8. A method comprising:
receiving by a processor of a software development computer from a web server, a user selection in a browser;
mapping the selection in the browser to a portion in a document object model (DOM) representing the selection;
mapping the portion in the DOM to a location range in a fetched file, the fetched file comprising a file received from a web server in response to an hypertext transfer protocol (HTTP) request, the DOM representing the fetched file, the DOM differs from the fetched file; and
mapping the location range in the fetched file to a location range in a source file that generated the user selection in the browser;
receiving updated content from the web server based on an altered source file; and
displaying the selection in the browser concurrently with the location range in the altered source file,
wherein the displayed selection in the dynamic browser file includes the updated content.

9. The method of claim 8, further comprising:
receiving metadata mapping location ranges in the fetched file to a corresponding location range in a source file that originated content at the location range in the fetched file, the metadata comprising a path to the source file and the corresponding location range within the source file corresponding to the location range in the fetched file.

10. The method of claim 9, further comprising:
generating a mapping table in memory of the software development computer, the mapping table mapping content in a browser to corresponding content in the fetched file by creating associations between the fetched file and the DOM.

11. The method of claim 10, further comprising:
generating server content by sending a request to the web server to generate the server content and displaying the server content in the browser.

12. The method of claim 9, further comprising:
generating a mapping table that maps the location range in the fetched file to the corresponding location range in the source file from which content at the location range in the fetched file was generated; and
displaying a browser display and corresponding source code.

13. The method of claim 8, further comprising:
displaying a tree data structure that represents a browser page, the browser page displayed in a browser.

14. The method of claim 8, further comprising:
mapping a selection comprising a Cascading Style Sheet style characteristic back to a source file that originated the Cascading Style Sheet style characteristic.

15. A device, comprising:
at least one processor and a memory;
the at least one processor configured to:
receive a selection in a browser;
map the selection in the browser to a location range in a document object model (DOM) block list;
map the location range in the DOM block list to a location range in a fetched file block list, a fetched file comprising a file received from a web server in response to a hypertext transfer protocol (HTTP) request, the DOM differs from the fetched file;
map the location range in the fetched file block list to a corresponding location range in a source file that generated the selection in the browser;
receive updated content from the web server based upon the web server processing one or more user alterations made to the source file; and
display concurrently the selection in the browser and the source file,
wherein the displayed selection includes the updated content.

16. The device of claim 15, wherein the at least one processor is further configured to:
render content in the browser comprising a production web server's response by executing a round trip to the production web server.

17. The device of claim 16, wherein the at least one processor is further configured to:
generate associations mapping the selection in the DOM to a location range in the DOM block list by matching identifiers in a first block list generated from the DOM and a second block list generated from the fetched file.

18. The device of claim 15, wherein the at least one processor is further configured to:
receive the fetched file from a web server, the fetched file associated with metadata that maps output location ranges in the fetched file to location ranges in source files that originate the output location ranges in the fetched file.

19. The device of claim 18, wherein the at least one processor is further configured to:
map a selection comprising a Cascading Style Sheet style characteristic back to a source file that originated the Cascading Style Sheet style characteristic.

20. The device of claim 15, wherein the at least one processor is further configured to:
provide a visualization of a tree data structure that represents a browser page, the browser page displayed in a browser.

* * * * *